Aug. 30, 1932.                J. M. DOUGHERTY                1,874,931
                       PRESSURE RELIEF VALVE DEVICE
                          Filed Aug. 24, 1929
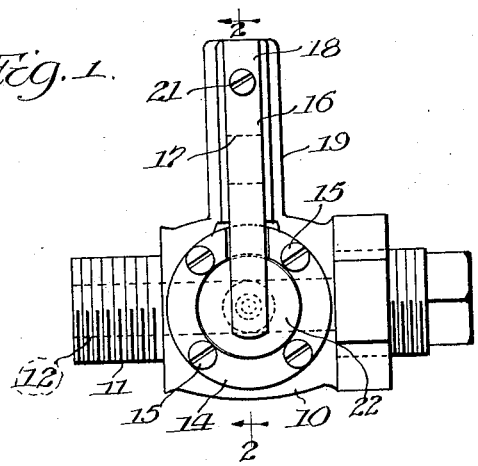
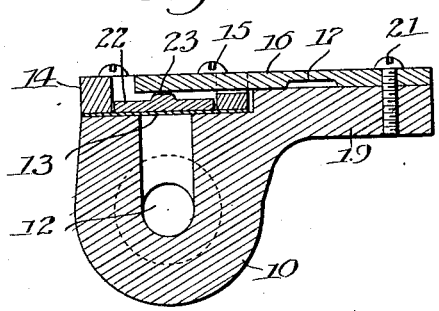
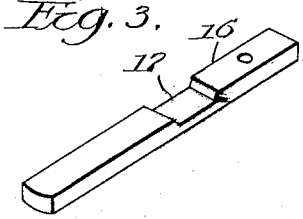
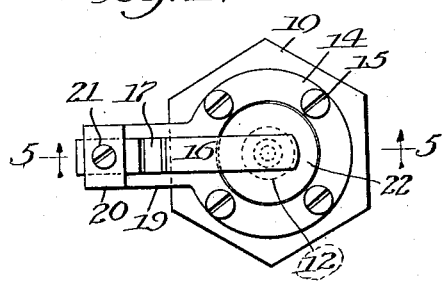
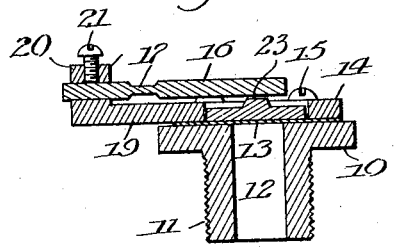
Witness
William J. Kilroy
Inventor
John M. Dougherty
by Hill & Hill
           Attys.

Patented Aug. 30, 1932

1,874,931

UNITED STATES PATENT OFFICE

JOHN M. DOUGHERTY, OF ST. LOUIS, MISSOURI

PRESSURE RELIEF VALVE DEVICE

Application filed August 24, 1929. Serial No. 388,179.

The invention relates to pressure relief devices for use in fluid pressure systems of various characters to relieve said system of excess pressure when said pressure exceeds a predetermined amount, to thereby insure against injury to any of the various parts connected with the system.

The invention has among its various objects the production of an extremely simple device of this character which will effectively resist pressures of a predetermined amount and which embodies the use of an element having a passage which communicates with the system, the passage being closed by an element which prevents escape of fluid pressure from the system and is held against opening of the passage through the agency of a fragile member which will resist a certain prescribed pressure and which severs upon application thereto of a pressure in excess of a predetermined amount and allows the element forming the closure to be actuated to open said passage and thus relieve the system.

A further object of the invention is the provision of the construction which may be quickly and cheaply restored to a condition for use. The invention has these and other objects all of which will be more readily understood when read in conjunction with the accompanying drawing in which several embodiments of which the invention is susceptible are shown, it being therefore, obvious that the invention is susceptible of other changes and modifications without departing from the spirit of the appended claims forming a part hereof.

In the drawing Fig. 1 is a front elevation of the device.

Fig. 2 is a section taken on line 2—2 of Fig. 1;

Fig. 3 is a perspective view of a fragile element employed in the structure;

Fig. 4 is an elevation of a modified device, and

Fig. 5 is a section taken on line 5—5 of Fig. 4.

The embodiment of the invention illustrated in the drawing contemplates the use of a body member 10 having means such as designated 11 whereby the body member may be connected for use with any suitable portion of the system which the device is designed to control. The body member 10 is provided with a passage 12 which communicates with the system above referred to. The passage 12 is closed by a member 13. This member 13 may as shown be in the shape of a disc and be formed of any desired preferably frangible material such as for instance, tin foil, rubber, oiled paper or any other material which is capable of being ruptured or removed from the passage so as to open the passage and complete a connection between the system and the atmosphere. This is preferably of a material which is more or less resilient to thus allow said disc to be flexed a certain degree and thus allow for a slight variation of pressure to exist in the system before an actual break of the disc occurs.

This disc 13 is held with relation to the body member through the agency of a ring 14 which is held relatively to the body member through the medium of screws such as 15, the ring being provided to clamp the disc between it and the body member and thereby hold said disc over the aperture. As before stated the structure contemplates the use of a fragile member 16 which will resist a predetermined pressure; however, will part or break when a pressure in excess of a predetermined pressure is applied thereto. This member 16 may be formed of glass, cast iron or any other fragile material. To facilitate breaking of the member 16 when an excess pressure is applied thereto, said member is provided with a weakened portion 17 which will insure breakage of the member 16 and allow the closure to be actuated to open the passage and thus allow the escape of fluid pressure existing in the system. The member 16 in the present instance is in the shape of a rod having one end thereof such as 18 rigidly but removably held with relation to the body portion 10. The opposite end of said rod extends to adjacent the disc 13 to cooperate with the disc or closure to resist predetermined pressures applied to the disc or closure. This fragile member 16 may be supported with relation to the body member in any convenient manner as for instance, by means of the standard or support 19 which may as shown, be part of the body portion 10 or the clamping ring 14 whereby the disc is held with relation to the body portion. In any event the support is provided with a means 20 which may include a screw 21 to provide means to removably secure the fragile rod with respect to the standard and the body of the device.

A metallic disc 22 is employed and arranged between the end of the fragile member 16 and frangible disc 13 forming the closure for the passage 12. This metallic disc 22 substantially corresponds to the diameter of the opening in the clamping ring and is provided with a projection 23 which is designed to engage the fragile member 16.

This metallic disc is provided to transmit the motion of the frangible disc 13 to the rod when a pressure is applied to the frangible disc in excess of a predetermined amount, to thereby cause parting or breaking of the rod at the weakened portion thereof and allow the excess pressure to act upon the frangible disc, cause it to be ruptured and complete a communication between the system and the atmosphere to thus relieve the system of excess pressure which would otherwise break some other element connected in the system.

The metallic disc 22 is spaced a suitable distance from the fragile rod to allow the disc to be moved a certain degree without affecting the rod and thus compensate for a certain degree of fluctuation of pressure in the system without causing breakage of the fragile rod.

From the foregoing description of the invention it is manifest that by the use of a fragile member, a construction is produced which will resist pressures of a predetermined amount, which, however, when a pressure in excess of said predetermined amount obtains in the system will act upon the frangible element forming the closure for the passage provided in the member 10 and transmit this excess pressure to the fragile rod 16 causing it and the frangible member 13 to respectively break and part and open the passage 12 which allows the fluid pressure contained in the system to escape to the atmosphere.

It is further evident that an extremely simple arrangement is provided which may be readily repaired, so that the system may again be restored to a condition of use.

Having thus described the invention, what I claim and desire to cover by Letters Patent is:

1. In a pressure relief device the combination of a member having a passage and means whereby said member may be applied for use, a frangible member closing said passage, a fragile element secured at one end, a member arranged between the opposite end of said fragile element and said frangible member, and providing means for transmitting pressure applied to said frangible member to said fragile element, said fragile element being separable and said frangible member being adapted to be ruptured to open said passage upon the application of pressure in excess of a predetermined resistance applied by said fragile element.

2. In a pressure relief device the combination of a member having a passage and means whereby said member may be applied for use, a resilient frangible member closing said passage, a fragile element secured at one end, a member arranged between the opposite end of said fragile element and said frangible member and providing means for transmitting pressure applied to said frangible member to said fragile element, said fragile element being separable and said frangible member being adapted to be ruptured to open said passage upon the application of pressure in excess of a predetermined resistance applied by said fragile element.

3. In a pressure relief device, the combination of a member having a passage and means whereby said member may be applied for use, an element closing said passage, a ring providing means for holding said element relatively to said passage, means providing resistance to a predetermined pressure applied to said element said means having a portion extending into the passage from an edge of said opening and being adapted to part upon application of a pressure in excess of said predetermined pressure to thereby allow said element to be actuated to open said passage and relieve said pressure, and a disc loosely mounted in said ring cooperating with said element to transmit pressure to said pressure resisting means.

4. In a pressure relief device, the combination of a member having a passage and means whereby said member may be applied for use, a flexible closure for said passage, means for applying resistance to a predetermined pressure applied to said closure, said means having a portion extending into the passage from an edge of said passage and having a weakened portion adapted to part upon application of a pressure in excess of said predetermined pressure to thereby permit actuation of said closure to open said passage and relieve said pressure.

5. In a pressure relief device, the combination of a member having a passage and means whereby said member may be applied for use, an element closing said passage, fragile means arranged transverse of said opening for applying a resistance to a predetermined pressure applied to said element, said means being secured at one end to said casing and having a portion which extends into the passage from one edge of said passage and being adapted to part upon application of a pressure in excess of said predetermined pressure to thereby permit actuation of said element to open said passage and relieve said pressure.

6. In a pressure relief device, the combination of a member having a passage and means whereby said member may be applied for use, a member having a weakened portion, an element providing a closure for said passage, said member having said weakened portion providing means for resisting a predetermined fluid pressure applied to said element providing said closure, said member having the weakened portion being secured at one end to said casing and having an end which extends into said passage from one edge of said opening and being adapted to part at said weakened portion to thereby allow said element providing said closure to be actuated to open said passage and relieve said pressure, and a second member arranged between said last mentioned end of said member having said weakened portion and the element providing the closure, said second member providing means for transmitting fluid pressure from said closure to the member having the weakened portion.

7. In a pressure relief device, the combination of a member providing a casing having a passage and means whereby said member may be applied for use, a frangible element closing said passage, means for applying a resistance to a predetermined pressure applied to said element, said means including a member having one end secured to said casing and having the opposite end thereof extending into the passage and having a weakened portion located between said ends, said member being adapted to part at said weakened portion upon application of a pressure in excess of said predetermined pressure to thereby permit actuation of said element to open said passage and relieve said pressure.

In witness whereof, I hereunto subscribe my name this 19th day of August A. D. 1929.

JOHN M. DOUGHERTY.